INVENTOR
LEON L. NOEL

BY Roy A. Plant

ATTORNEY

United States Patent Office 3,521,923
Patented July 28, 1970

3,521,923
TONGS
Leon L. Noel, R.R. 3, Box 285,
Battle Creek, Mich. 49017
Filed Feb. 15, 1968, Ser. No. 705,838
Int. Cl. A47j 45/10
U.S. Cl. 294—33       6 Claims

ABSTRACT OF THE DISCLOSURE

The present invention deals with a special form of tongs or receptacle holder, having a pair of handles each having a wedging cam portion opposite the other, with the handles extending beyond said cam portion and turning outwardly and then inwardly and back substantially symmetrically to a pair of substantially parallel gripping ends, so that by tightly gripping the handles the cam portions will firmly push the receptacle up against the gripping ends for improved holding capacity.

---

The present invention relates broadly to gripping and handling devices, and more specifically to a special form of tongs particularly adapted for the handling of metal cans of goods which are normally heated before eating.

Tongs for gripping and picking up articles substantially universally depend upon gripping pressure alone, as in the case of a pair of pliers, to hold the part being gripped. This many times is not wholly satisfactory and a simple way of making the holding power of the tongs greater, without going to vice-type devices, is much desired and especially so by campers or hunters who wish to travel or "rough it" with a minimum of cooking equipment. It was a recognition of this problem and the lack of a simple commercial solution to same which lead to the conception and development of the present device.

Accordingly, among the objects of the present invention is the provision of a special form of tongs which utilizes both wedging and gripping action for holding items such as cans to be picked up and moved.

A further object of this invention is to provide a pair of tongs, of simple construction having its gripping ends turned outward and then inward so that their ends grip the side of a can or the like on its side opposite to the handles of the tongs.

A still further object is to provide a pair of improved tongs, the gripping ends of which are turned outward and then inward so that their ends grip the can or the like on the opposite side from the tong handles, which are shaped to have wedging shoulders in contact with the near side of the can or the like to be picked up so that the tighter the handles are gripped the more these wedging shoulders force the can or the like outward against the gripping ends of the tongs to increase their holding power.

Still further objects and advantages of this invention will appear as the description proceeds.

To the accomplishment of the foregoing and related ends, the invention, then, consists of the tong features hereinafter fully described and particularly pointed out in the claims, the annexed drawing and the following description setting forth in detail certain illustrative embodiments of the invention, such disclosed embodiments illustrating, however, but one of various ways in which the principle of the invention may be used.

In the annexed drawing:

FIG. 2 is a top view of the tongs shown in solid lines in its normal position when not in use, and in dashed lines in the position which they take when gripping the sides of a can or the like.

Figure 1:
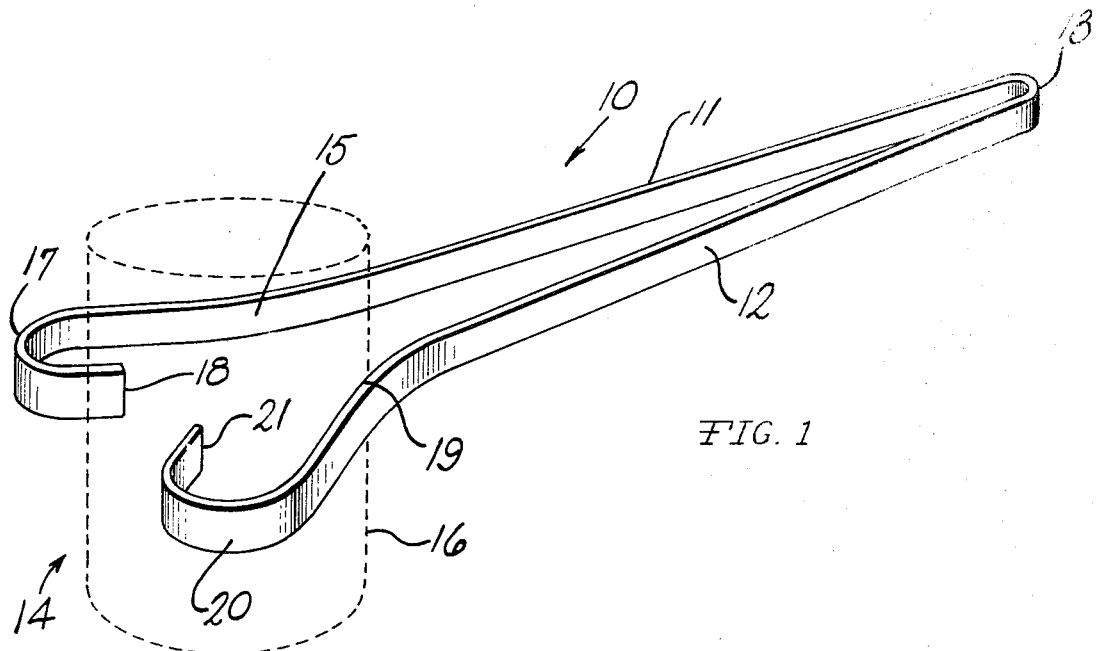
FIG. 1 shows a perspective view of a preferred form of the tongs of the present invention, with a can or the like in dashed lines being gripped by same.
Figure 2:
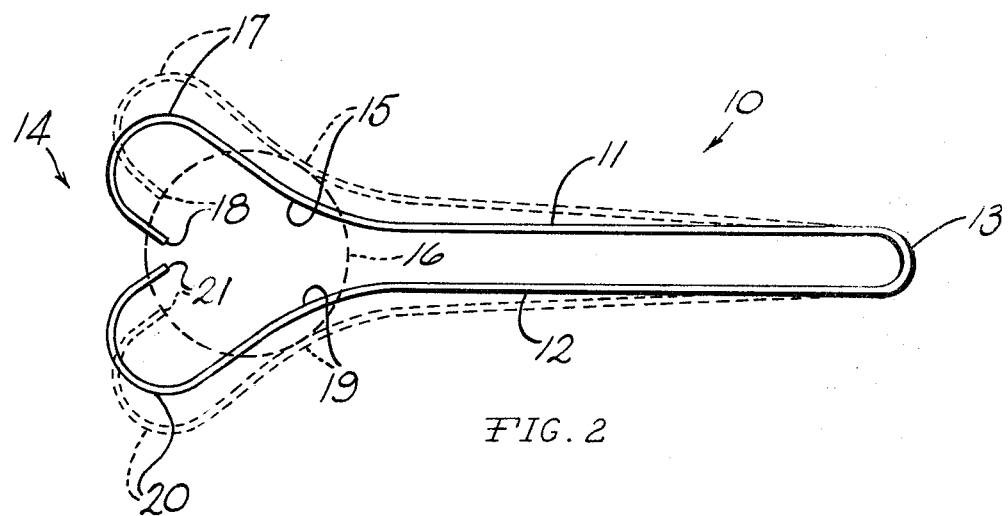

Referring to FIGS. 1 and 2 of the drawing, it will be noted that the tongs 10 have a pair of substantially parallel hand gripping handles 11 and 12 joined together at one end by a conventional joining means 13 which is shown as but not limited to a smoothly rounded end. This showing of rounded end joining means is to be considered as diagrammatic of the various equivalent means of joining, such as welding, brazing, riveting, twisting and the like.

At the gripping portion 14 of the tongs, as is more clearly brought out in the dashed line portion of FIG. 2, it will be noted that here the handle 11 has a wedging cam portion 15 in contact with the handle 11 side of can 16. This cam portion 15 is then followed by an outwardly and then backwardly turned end portion 17 terminating in a gripping end 18. In correspondence with the gripping portion of handle 11, handle 12 has a wedging cam portion 19, an outward and then backward turned end portion 20, terminating in a gripping end 21. The gripping ends 18 and 21 are preferably so positioned that they generally point toward the wedging cam portion of the opposite handle thus giving a very firm grip the tighter the handles 11 and 12 are forced together.

Where the present improved tongs are used by campers for putting canned food such as soup, as a small canned item, or canned peas, cut beans, lima beans, canned beef stew or chili as moderately larger canned items, in a bed of coals, or on a grill, for heating, and later removing when hot, a suitable size pair of the preesnt improved tongs 10 has been found to be 16 inches long, the handles 11 and 12 approximately parallel in unexpanded position and approximately 1 inch apart, and depending upon the size of the can gripped, the wedging cam portion 15 or 19 is approximately 2½ inches to 3½ inches from the corresponding gripping ends 18 or 21, as shown in the drawing. The metal from which the tongs were made was in the form of a strip of mild steel band iron which is relatively stiff but yet sufficiently resilient for use in tongs, and approximately ⅛ inch thick and ½ inch wide. The tongs obviously need not be of the noted specific size and the metal itself may be of any other suitable type such as spring steel, bronze, or the like, and accordingly the example given is not to be construed as limiting the invention but rather as a typical example of how the invention can be used under one situation.

With the tongs in engagement with a can as shown in dotted lines in FIG. 2, it is to be noted that as the handles 11 and 12 are squeezed toward each other, the wedging cam portions 15 and 19 exert pushing pressure on the adjacent side of the can to force same outward from the adjacent end of said handles and correspondingly up against the gripping ends 18 and 21 of the tongs to firmly hold the can. These gripping ends 18 and 21 are substantially perpendicular to the side of the can and dig into same with a firm grip facilitating safe holding of the can for lifting or moving it. While the gripping ends 18 and 21 are shown straight in FIG. 1, it is to be considered that this is diagrammatic of the various other forms these ends can take such as pronged or serrated.

Other modes of applying the principle of my invention may be employed instead of the one explained, change being made as regards the article herein disclosed, provided the means stated by any of the following claims or the equivalent of such stated means be employed.

I therefore particularly point out and distinctly claim as my invention:

1. A receptacle holder comprising:
   (a) a pair of handle members, (b) means joining the handle members at one end thereof,
(c) an outwardly turned wedging cam portion located on each of the handle members, and
(d) a gripping portion including point ends which are located on the handle members and point inwardly to engage the outer side of the receptacle remote from the handle members,
(e) said point ends and wedging cam portion being positioned with respect to each other so that the point end of each said handle member is generally directed toward the wedging cam portion located on the other handle member.

2. A receptacle holder as defined in claim 1 wherein said wedging cam portion is responsive to a squeezing movement on said handle members toward each other to force the receptacle outwardly against the point ends to facilitate firm gripping and holding of the receptacle.

3. A receptacle holder as defined in claim 1 wherein said handle members are of strip metal continuously and resiliently extending from one handle member to the other at one end and formed at the other end for gripping of said receptacle at widely spaced points.

4. A receptacle holder as defined in claim 1 wherein said handle members are formed of resilient but stiff strip metal extending continuously through the joining means.

5. A receptacle holder as defined in claim 4 wherein the holder is formed of a one-piece strip of metal having a continuous U-shaped configuration,
the strip is bent outwardly at a predetermined distance from each end thereof to form the wedging cam portion, and
each end of the strip is bent inwardly to form the point ends.

6. A receptacle holder as defined in claim 5 wherein said handle members are in closely spaced relationship to each other and must be moved outwardly with respect to the receptacle to fit therearound.

References Cited

UNITED STATES PATENTS

| | | | |
|---|---|---|---|
| 3,137,880 | 6/1964 | Kubit et al. | 294—99 |
| 2,839,325 | 6/1958 | Jeanfavre | 294—99 |
| 2,474,167 | 6/1949 | Rundell | 294—33 |

EDWARD A. SROKA, Primary Examiner

R. S. GAITHER, Assistant Examiner

U.S. Cl. X.R.

294—99